United States Patent [19]
Fogelberg

[11] 4,124,085
[45] Nov. 7, 1978

[54] AUTOMATIC FOUR-WHEEL DRIVE TRANSFER CASE

[75] Inventor: Mark J. Fogelberg, Muncie, Ind.

[73] Assignee: Borg-Warner Corporation, Chicago, Ill.

[21] Appl. No.: 725,071

[22] Filed: Sep. 21, 1976

[51] Int. Cl.² ................ B60K 17/34; F16D 41/10
[52] U.S. Cl. .................... 180/49; 74/665 G; 192/36; 192/44; 192/114 R
[58] Field of Search ............ 180/44 R, 45, 46, 47, 180/48, 49, 50; 74/665 G; 192/35, 36, 43, 44, 45, 114 R

[56] References Cited

U.S. PATENT DOCUMENTS

| 1,290,031 | 1/1919 | Adler | 192/50 |
|---|---|---|---|
| 2,699,852 | 1/1955 | Cost | 192/46 |
| 2,796,941 | 6/1957 | Hill | 180/44 R |
| 3,055,471 | 7/1962 | Warn et al. | 192/35 X |
| 3,221,574 | 12/1965 | Sampietro et al. | 74/665 |
| 3,283,611 | 11/1966 | Weismann et al. | 74/650 |
| 3,295,625 | 1/1967 | Ordorica et al. | 180/44 R |
| 3,300,002 | 1/1967 | Roper | 192/35 |
| 3,406,798 | 10/1968 | Curran | 192/35 |
| 3,584,713 | 6/1971 | Tani | 192/45 X |
| 4,047,601 | 9/1977 | Fogelberg et al. | 180/44 R X |

FOREIGN PATENT DOCUMENTS

| 899,607 | 8/1944 | France | 180/44 |
|---|---|---|---|
| 857,520 | 12/1960 | United Kingdom | 192/44 |

*Primary Examiner*—John P. Silverstrim
*Attorney, Agent, or Firm*—Julian Schachner

[57] ABSTRACT

A power transfer mechanism incorporated in a multiple path drive system comprises a transfer case disposed between a source of input torque and a pair of drive axles. Torque is transferred directly to the fixed axle and is transferred automatically to the steering axle through a double-acting overrunning clutch when required. The clutch is biased to advance toward one engaged position, but is prevented from locking by a direction-sensitive latch so long as a normal overrunning condition is present.

15 Claims, 6 Drawing Figures

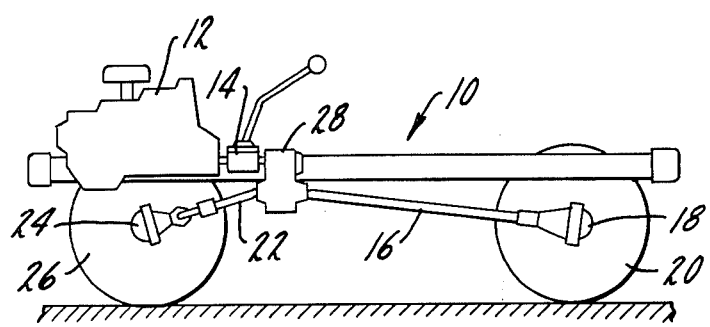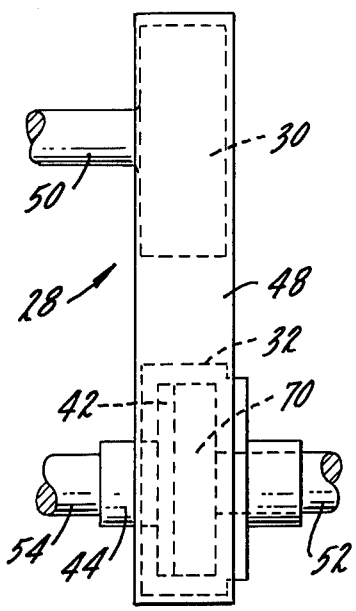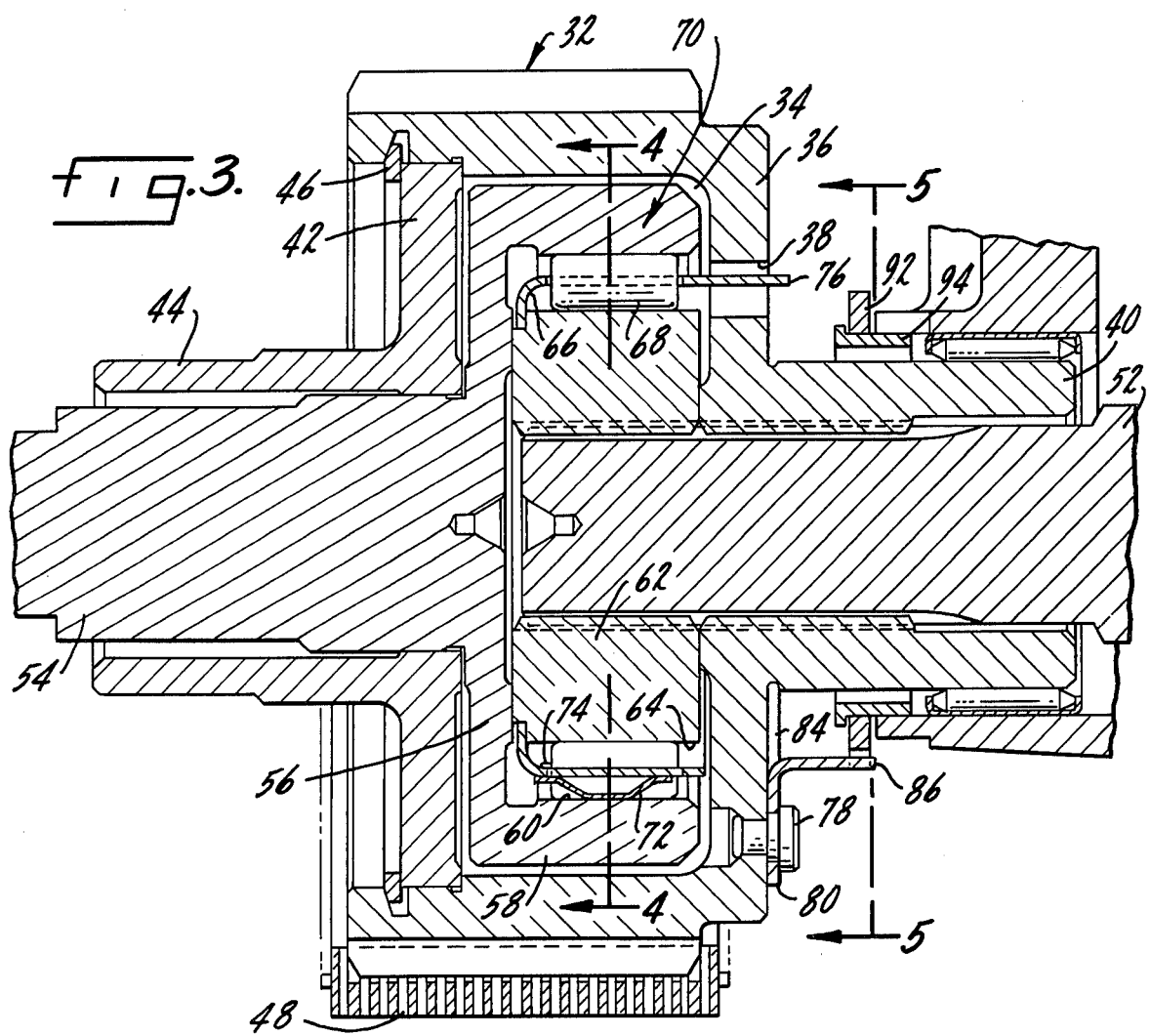

AUTOMATIC FOUR-WHEEL DRIVE TRANSFER CASE

BACKGROUND OF THE INVENTION

This invention relates generally to a power transfer mechanism adapted to be incorporated in a multiple path drive system, for example a four-wheel drive vehicle. More particularly, it relates to a torque transfer case adapted to receive torque from a prime mover and to provide torque for one drive axle when two-wheel drive is adequate and to provide torque for both drive axles automatically when four-wheel drive is required. The torque transfer case incorporates a double-acting overrunning clutch for automatically engaging and disengaging the four-wheel drive function.

In recent years, there have been many improvements in automotive drive trains, including improvements relating to the transfer of torque from a prime mover to drive axles. Where four-wheel drive systems are used, transfer cases have been developed which direct torque to one output to drive a fixed axle and through an overrunning clutch to another output for driving a steering axle. The clutch automatically engages and disengages the four-wheel drive function. However, an excessive overrunning condition may cause undesirable clutch lockup, thus negating its automatic function. One attempt at a solution to this problem was the use of a speed-sensitive blocking structure, as disclosed in U.S. application Ser. No. 615,001 filed Sept. 19, 1975 (now U.S. Pat. No. 4,044,820). It was then found that an excessive overrunning condition may obtain at speeds below the threshold speed of such a structure. Thus, there was still a need to provide an overrunning clutch which engages and disengages automatically, but which prevents undesirable engagement even at low speeds. This need now is believed to have been met by a blocking structure which is direction-sensitive rather than speed-sensitive. Such a direction-sensitive blocking structure is disclosed in U.S. application Ser. No. 716,629 filed Aug. 23, 1976 and U.S. application Ser. No. 691,672 filed June 1, 1976. The latter is a continuation-in-part of U.S. application Ser. No. 637,923 filed Dec. 5, 1975 (now abandoned).

Subsequently, it was found that undesirable clutch lockup in the wrong engaged position can occur when, for example, a direction reversal is initiated while the vehicle is moving and in a turning configuration. This can occur notwithstanding incorporation in the clutch of blocking devices known heretofore.

SUMMARY OF THE INVENTION

This invention is directed to an improved four-wheel drive system including a transfer case of the type having an overrunning clutch therein which includes means to eliminate the aforementioned undesirable clutch lockup. The transfer case is adaptable for transferring torque from an input directly to fixed (herein called rear) axle wheels and through the overrunning clutch to steering (herein called front) axle wheels. When the rear wheels lose traction in either direction of rotation, the clutch effectively engages and torque is transferred to both axles, thereby establishing a four-wheel drive condition. When traction is restored to the rear wheels, the clutch effectively disengages and the system reverts back to a two-wheel drive condition.

The transfer case includes a front output incorporating an outer clutch race of cylindrical configuration. A rear output incorporates an inner clutch race having a plurality of ramp surfaces, each associated with a roller carried by a roller cage. Bias for the roller cage is provided by clips rotatable with the cage and in frictional contact with the outer race. As a result, the cage tends to follow the outer race and, when it overruns the inner race, to advance the rollers toward a wedging position in which the clutch is engaged.

With a double-acting overrunning roller clutch incorporated in the system, it is desirable to guard against undesirable clutch engagement. This is accomplished by a direction-sensitive latch which prevents undesirable roller advance beyond the central or freewheel position. The latch is frictionally biased by a drag ring adapted for frictional engagement with the transfer case housing. Upon movement of the vehicle, a drag force is developed which causes the latch to pivot in the path of the roller cage, thereby preventing advance of the cage and its associated rollers beyond the central position, and wedging them into the central position if necessary. The relationship is such that if a direction reversal is initiated while the vehicle is moving and in a turning configuration, the latch insures that the cage and its associated rollers are in their proper position, thus preventing undesirable clutch engagement. The device is direction-sensitive and operates in either direction of rotation, without regard to the speed of rotation.

Thus, the requirements of various vehicle manufacturers for improved automatic four-wheel drive power trains may be satisfied with a simplified and economical assembly, as will be described.

BRIEF DESCRIPTION OF THE DRAWINGS

The objects and advantages of this invention will become apparent to those skilled in the art upon careful consideration of the specification herein, including the drawings, wherein:

FIG. 1 is a schematic view of the four-wheel drive vehicle;

FIG. 2 is a schematic view of the torque transfer case;

FIG. 3 is a sectional view showing details of the double-acting overrunning clutch incorporated in the torque transfer case;

Figure 4:
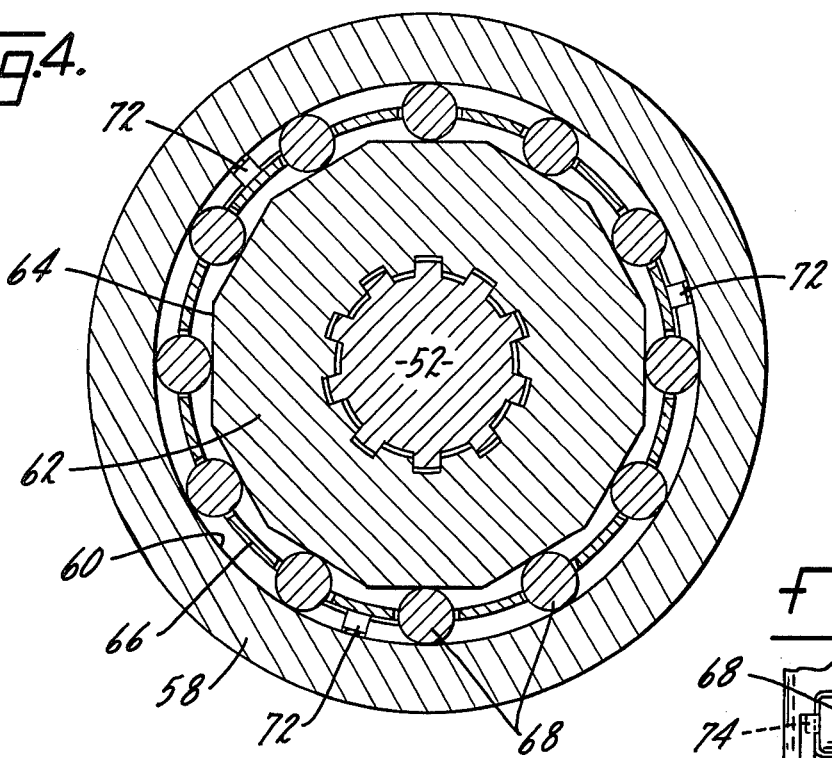
FIG. 4 is a sectional view taken along the line 4—4 of FIG. 3 showing additional details of the double-acting overrunning clutch.

While this invention is susceptible of embodiment in many different forms, there is shown in the drawings and will herein be described in detail a preferred embodiment with the understanding that the present disclosure is to be considered as an exemplification of the principles of the invention and is not intended to limit the invention to this embodiment.

DESCRIPTION OF THE PREFERRED EMBODIMENT

Referring now to the drawings in greater detail, there is shown generally in FIG. 1 a multiple path drive system in the form of a four-wheel drive vehicle 10 having a prime mover 12 in driving relationship with a suitable manual or automatic transmission 14. A propeller shaft 16 is in driving engagement with a fixed axle assembly 18, which in turn supports a pair of ground-engaging wheels 20. Another propeller shaft 22 is in driving engagement with a steerable axle assembly 24, which in turn supports a pair of ground-engaging wheels 26. A torque transfer case 28 is in engagement with transmission 14 for receiving torque from prime mover 12, and is in engagement with propeller shafts 16 and 22 respectively for transmitting torque to ground-engaging wheels 20 and 26.

As shown in FIGS. 2, 3 and 4, transfer case 28 includes a first sprocket 30 and a second sprocket 32. Sprocket 32 defines an interior pocket 34 and includes a flange 36 which in turn defines a plurality of openings 38 extending therethrough and spaced around its periphery to communicate pocket 34 with the exterior thereof. Sprocket 32 also includes an annular extension 40 extending outwardly from flange 36. Also forming a portion of sprocket 32 is a flange 42 having an annular extension 44 extending outwardly therefrom. Flange 42 is secured to sprocket 32 by means of a locking ring 46 or the like. A suitable chain 48 couples sprockets 30 and 32. Sprocket 30, chain 48 and sprocket 32 form a chain drive train.

An input shaft 50 extends into transfer case 28 and is engaged with sprocket 30. Input shaft 50 is adapted to receive torque, for example, from transmission 14 of vehicle 10. It should be understood that input shaft 50 may be the output shaft of such a transmission.

A rear output shaft 52 is engaged with propeller shaft 16 and extends into transfer case 28. Output shaft 52 is splined to extension 40 of sprocket 32. A front output shaft 54 is engaged with propeller shaft 22 and extends into transfer case 28. Output shaft 54 defines an upstanding flange 56 and an annular extension 58 within pocket 34 of sprocket 32. Extension 58 defines an outer clutch race 60 of cylindrical configuration.

An annular element or cam 62 is splined to output shaft 52. Cam 62 is within pocket 34 and defines an inner clutch race 64 comprising a plurality of flats or ramp surfaces.

An annular cage 66 supports a plurality of wedging elements 68, one of which is associated with each flat of inner race 64. Extension 58, cam 62, races 60 and 64, cage 66 and wedging elements 68 comprise together a double-acting overrunning clutch or freewheel device 70. In one preferred form of the invention, wedging elements 68 are rollers, and clutch 70 is a roller clutch.

Figure 6:
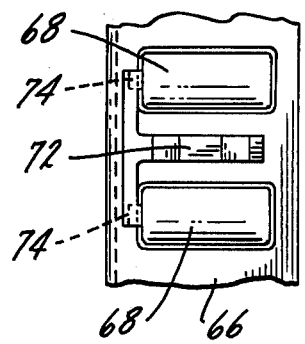
FIG. 6 is a detailed view showing additional features of the biasing structure.

As shown in FIGS. 3, 4 and 6, a plurality of spring clips 72 are secured to cage 66, as at 74, and extend between adjacent rollers 68. Clips 72, which may be of beryllium-copper or the like, are in frictional contact with outer race 60 so as to establish smooth frictional engagement therewith. As a result, bias forces are developed which act on cage 66 such that it tends to follow extension 58.

Cage 66 defines a plurality of tabs 76 extending through openings 38 of sprocket 32.

Figure 5:
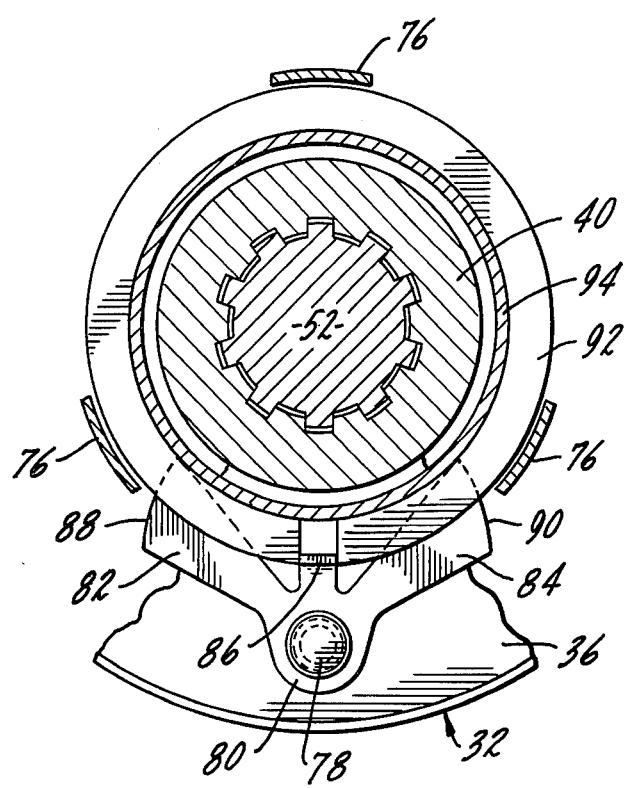
FIG. 5 is a sectional view taken along the line 5—5 of FIG. 3 showing details of the latch.

Turning now to FIGS. 3 and 5, the direction-sensitive latch includes a pin 78 secured to flange 36 of sprocket 32, and a rocker element 80 pivotally supported by pin 78. Element 80 includes a pair of arms 82 and 84 and a projection 86. Arms 82 and 84 respectively define contoured ends 88 and 90 adjacent two of tabs 76.

A drag ring 92 is contiguous with projection 86 and is in frictional contact with a wear ring 94, which in turn is pressed to the housing of transfer case 28. Thus, drag ring 92 is in smooth frictional engagement with the housing of transfer case 28. Drag ring 92 is shown spaced from tabs 76 of cage 66. However, it should be understood that tabs 76 may be piloted on drag ring 92, if desired.

Torque is received by input shaft 50 and is transferred through the chain drive train to drive output shaft 52. Output shaft 52 is connected through propeller shaft 16 to drive fixed rear axle assembly 18 and its associated wheels 20. Output shaft 54 is connected through propeller shaft 22 to drive steerable front axle assembly 24 and its associated wheels 26.

Extension 58 need not overrun cam 62 in order for clutch 70 to be effective, as clutch 70 is a freewheel device. It should be understood, however, that in a preferred form of the invention overrun may be built into clutch 70. In any event, extension 58 inherently rotates faster than cam 62 when the vehicle is turning, since the front wheels travel through a larger radius than do the rear wheels.

With reference to FIGS. 4 and 5, assume output shaft 52 and cam 62 are rotating in the clockwise direction. Output shaft 54 and extension 58 also rotate in the clockwise direction, but tend to overrun. The bias on roller cage 66, developed by the frictional engagement of spring clips 72 with outer race 60, causes rollers 68, in effect, to follow extension 58 in the clockwise direction. Rollers 68 tend to advance and wedge between inner race 64 and outer race 60 so as to engage clutch 70.

The direction-sensitive latch disclosed herein is operable independently of speed. Initial vehicle movement causes clockwise rotation of sprocket 32 to drive output shaft 52 and cam 62. Pin 78, secured to flange 36 of sprocket 32, rotates therewith and with cam 62. Element 80 is carried with pin 78. Drag ring 92 tends to lag pin 78 due to its frictional contact with wear ring 94. Projection 86, and thus element 80, are pivoted clockwise about pin 78. Arm 82 is moved inwardly to clear its associated tab 76, and arm 84 is moved outwardly to block clockwise rotational displacement of its associated tab 76, and thus cage 66, beyond the central position. As a result, the tendency of rollers 68 to advance and wedge between races 60 and 64 is blocked. Tabs 76 have limited freedom of movement such that cage 66 and rollers 68 are movable counterclockwise to a clutch engaging position, but may not advance clockwise beyond the central position toward the opposite clutch engaging position. Torque is transferred to output shaft 52 but not to output shaft 54. In this condition, the operation is essentially that of a conventional two-wheel drive vehicle.

When the rear wheels lose traction, output shaft 52 will speed up. Cam 62 will tend to overrun extension 58. This tendency will cause rollers 68 effectively to wedge between races 60 and 64. When this takes place, cam 62 and extension 58 will rotate in unison, and torque will be transferred both to output shaft 52 and through clutch 70 to output shaft 54. In this condition, the operation is essentially that of a conventional four-wheel drive vehicle in locked-up mode.

When the rear wheels regain traction, output shaft 52 will slow down, and output shaft 54 will again tend to overrun output shaft 52, thereby effectively disengaging clutch 70 and restoring the vehicle to the two-wheel drive condition.

Thus, it will be seen that the transfer case provides for establishment of four-wheel drive automatically, as required, and for establishment of two-wheel drive automatically when four-wheel drive is not required. This automatic engaging and disengaging feature is provided when the vehicle is moving in either the forward or reverse directions; that is, when output shafts 52 and 54 are rotating in either the clockwise or counterclockwise directions as shown in FIGS. 4 and 5.

There is a set of circumstances where the invention herein has an inherent advantage. Assume that the vehicle is moving in a turn and a torque reversal is initiated. This could occur, for example, when the vehicle is backing out of a driveway and the driver shifts the transmission selector lever from reverse to drive. The vehicle comes to a stop and starts to accelerate forward. At this point there is no relative motion between extension 58, cam 62 and the other clutch elements, as clearances and driveline windup had been taken up while the vehicle was moving in reverse. Rollers 68 could be trapped on the wrong side of cam 62 when the vehicle moves forward and extension 58 overruns cam 62. However, in accordance with the invention herein, ends 88 and 90 of arms 82 and 84, respectively, are contoured such that upon operation of the latch, tabs 76 will be cammed out of the trapped position and moved to the central position, whereupon action of clutch 70 is as described above.

The biasing forces developed by spring clips 72 should be relatively small; large enough so that cage 66 follows outer race 60 but not so large that drag ring 92 must develop excessive drag in order to enable the wedging action of the latch, when required. If considerable overrun is built into clutch 70, this wedging action may take place even when the vehicle is not in a turning configuration.

It should be understood that while a preferred embodiment of the invention has been shown and described, this is illustrative and may be modified by those skilled in the art without departing from the scope thereof, which is to be limited only by the claims herein.

I claim:

1. In a four-wheel drive vehicle having a transfer case for transferring rotary motion from a source of power to first and second pairs of traction wheels, said transfer case including a housing, an input shaft and first and second output shafts rotatably supported in said housing, and means in said housing for transferring rotary motion from said input shaft to said output shafts, said transferring means coupling said input shaft with said first output shaft and including an overrunning clutch coupled with said second output shaft, said clutch having first and second elements respectively rotatable with said first and second output shafts and defining first and second clutch races, and a plurality of rollers supported between said clutch races for relative movement between two clutch engaging positions; the improvement comprising means in frictional engagement with said second element for biasing said rollers toward one of said clutch engaging positions, and latch means responsive to rotation of said first element for blocking said relative movement of said rollers to said one clutch engaging position, said latch means being constructed and arranged to be capable of camming said rollers out of said one clutch engaging position in response to said rotation of said first element.

2. The invention of claim 1, said latch means being movable to a blocking position in response to said rotation of said first element for blocking said relative movement of said rollers to said one clutch engaging position, said rollers being movable relatively between said other clutch engaging position and a clutch disengaging position when said latch means is in said blocking position.

3. The invention of claim 1, said latch means being operative for blocking said relative movement of said rollers to said one clutch engaging position independently of the speed of rotation of said first element.

4. Power transmission apparatus comprising a housing, a first element supported for rotation in said housing and defining a plurality of cam surfaces, a second element supported for rotation in said housing and defining an annular surface, an annular cage, a plurality of rollers supported by said cage and subject to rotational displacement therewith between a freewheel position and two positions in which said rollers are in wedging engagement with said surfaces, means in frictional contact with said annular surface for biasing said cage into rotational displacement toward one of said engaging positions, and latch means responsive to rotation of one of said elements relative to said housing for blocking rotational displacement of said cage to said one engaging position, said latch means being constructed and arranged to be capable of camming said cage out of said one engaging position in response to said rotation of said one element.

5. The invention of claim 4, said one element being said first element.

6. The invention of claim 5, said latch means being responsive to friction developed upon said rotation of said first element for blocking said rotational displacement of said cage to said one engaging position.

7. A torque transfer assembly comprising a housing, an input member and first and second output members supported for rotation in said housing, means coupling said input member with said output members for transfer of torque therebetween, said coupling means including an overrunning clutch having wedging means movable between two clutch engaging positions establishing torque transfer paths with said second output member, means responsive to rotation of at least a single member in one direction for biasing said wedging means toward one of said clutch engaging positions, and latch means operable in response to rotation of one of said members in said one direction for blocking movement of said wedging means to said one clutch engaging position, said latch means being constructed and arranged to be capable of forcing said wedging means out of said one clutch engaging position upon operation thereof.

8. The invention of claim 7, said latch means being constructed and arranged to be operable independently of the speed of rotation of said one member.

9. The invention of claim 7, said latch means including first means movable to effect said blocking of said wedging means, and second means responsive to said rotation of said one member for effecting said movement of said first means.

10. The invention of claim 9, said second means being in frictional contact with said housing for developing a frictional drag force in response to said rotation of said one member, thereby effecting said movement of said first means.

11. The invention of claim 10, said first means being pivotal in the path of said wedging means, and being capable of camming said wedging means away from said one clutch engaging position upon pivotal movement thereof.

12. Power transmission apparatus comprising a first rotatable element, a second rotatable element, a cage, a plurality of rollers supported by said cage and subject to rotational displacement therewith relative to said elements between a central freewheel position and two positions in which said rollers are in wedging engagement with said elements, means in frictional contact with said second element and responsive to rotation thereof for biasing said cage into rotational displacement toward one of said engaging positions, and means responsive to rotation of one of said elements for blocking rotational displacement of said cage to said one engaging position, said blocking means including arm means pivotally supported by and rotatable with said one element, said arm means being pivotal in the path of rotational displacement of said cage upon said rotation of said one element, and means responsive to friction developed upon said rotation of said one element for retarding said rotation of said arm means, thereby effecting said pivoting of said arm means, said arm means defining means for camming said cage away from said one engaging position in response to said pivoting thereof.

13. The invention of claim 12, said one element being said first element.

14. The invention of claim 13, said biasing means biasing said cage toward said one engaging position in response to rotation of said second element in one direction and toward said other engaging position in response to rotation of said second element in another direction, said friction responsive means being responsive to rotation of said first element in said one direction for pivoting said arm means in one direction to block said displacement of said cage toward said one engaging position and responsive to rotation of said first element in said other direction for pivoting said arm means in another direction to block said displacement of said cage toward said other engaging position.

15. The invention of claim 14, said arm means defining means for camming said cage away from said one engaging position in response to said pivoting thereof in said one direction and away from said other engaging position in response to said pivoting thereof in said other direction.

* * * * *